United States Patent [19]

Siligoni et al.

[11] Patent Number: 4,897,872

[45] Date of Patent: Jan. 30, 1990

[54] INTERFACE CIRCUIT BETWEEN A SUBSCRIBER'S TELEPHONE LINE AND EXCHANGE CONTROL COMPONENTS, WITH REDUCED CURRENT CONSUMPTION IN THE CASE OF A GROUNDED CABLE

[75] Inventors: Marco Siligoni, Vittuone; Emilio Lorena, Parona, both of Italy

[73] Assignee: SGS-Thomson Microelectronics Srl, Agrate Brianza, Italy

[21] Appl. No.: 291,297

[22] Filed: Dec. 28, 1988

[30] Foreign Application Priority Data

Dec. 28, 1987 [IT] Italy .................................. 23236 A/87

[51] Int. Cl.[4] ............................................. H04M 19/00
[52] U.S. Cl. ...................................... 379/412; 379/399
[58] Field of Search ................ 379/399, 412, 413, 331, 379/324

[56] References Cited

U.S. PATENT DOCUMENTS

| | | | |
|---|---|---|---|
| 4,709,296 | 11/1987 | Hung et al. ...................... | 379/412 X |
| 4,718,084 | 1/1988 | Dragotin ............................ | 379/412 |
| 4,782,507 | 11/1988 | Siligoni et al. ...................... | 379/399 |

Primary Examiner—James L. Dwyer
Attorney, Agent, or Firm—Wenderoth, Lind & Ponack

[57] ABSTRACT

An interface circuit between a subscriber's telephone line and exchange control components, with a reduced current consumption in the case of a grounded cable, includes a control circuit which senses the increase in the amplitude of the longitudinal currents on the line due to the grounded cable condition and consequently controls the disconnection of the current supplied to the line. However, the line is still supplied periodically for very short periods so as to reduce as far as possible current consumption during the grounded cable condition, but to allow the control circuit to sense the removal of the breakdown and to restore the normal current supplied to the line.

5 Claims, 3 Drawing Sheets

INTERFACE CIRCUIT BETWEEN A SUBSCRIBER'S TELEPHONE LINE AND EXCHANGE CONTROL COMPONENTS, WITH REDUCED CURRENT CONSUMPTION IN THE CASE OF A GROUNDED CABLE

BACKGROUND OF THE INVENTION

The present invention relates to telephone circuits which can be monolithically integrated and in particular to telephone interface circuits between the subscriber's telephone line and exchange control components which not only receive, amplify and transmit signals but also supply the line itself.

A serious problem which may arise with a subscriber's telephone line is the breakage of the line itself or of the telephone cable which contains it together with other lines.

If, following the breakage of the line, both the wires of the line are short-circuited to ground as is the case, for instance, when the line is cut on wet ground, the condition know as a grounded cable occurs.

In this condition the supply circuit supplies all the current available.

In telephone interface circuits, as is normally the case for all integrated circuits, there is a maximum instantaneous current limitation to avoid damage to the circuit components (the limitation current may have a typical value of 100mA).

The part of the interface circuit which acts as a supply source for the line operates, however, at high voltages (from $-48$ to $-60$ V with respect to the ground potential) and the electrical power dissipated is therefore very high.

Adequate limitation of the power dissipated must therefore be provided in the circuit by means of the heat protection conventionally incorporated in integrated circuits.

Although the problem can be partially resolved in this way in the case of an individual subscriber's telephone line, it is particularly serious when the grounded cable condition affects all of the telephone lines contained in a multiple telephone cable which has been accidentally cut.

The overall consumption of current may in this case exceed the current capacity of the exchange supply device (battery), causing the exchange protection apparatus to come into operation and thus completely closing down its operation.

Telephone communications, including those on lines not affected by the breakdown, are thus interrupted until the cable is repaired or isolated.

The only solution to the problem at present is to further limit the maximum current which can be supplied by the individual interface circuit, connected to a subscriber's telephone line, to a level compatible with the overall capacity of the exchange supply device, even in the case of a multiple grounded cable.

An excessive limitation of the current which can be supplied by the interface circuit to the subscriber's telephone line conflicts, however, with other requirements.

SUMMARY OF THE INVENTION

The object of the present invention is to provide a telephone interface circuit between a subscriber's telephone line and exchange control components which can be monolithically integrated and which allows a drastic reduction of the consumption of electrical energy in the case of a grounded cable with no restriction of the normal performance of the system.

This object maybe achieved by providing a telephone circuit for forming an interface between a subscriber's telephone line and exchange control components, comprising: a means for supplying the subscriber's telephone line; a means for receiving, amplifying and transmitting signals under the control of the exchange control components; a current detecting means for generating a measurement signal corresponding to the instantaneous value of the common-mode currents on the line and a circuit biasing means having at least a control terminal for enabling the normal operation of the telephone circuit and for causing the disconnection of at least said means supplying the subscriber's telephone line when a signal is supplied to said control terminal; a threshold comparator having a first input terminal to which the signal generated by said means for detecting current is supplied; a second input terminal to which a reference signal is supplied and an output terminal via which said comparator generates a signal when the value of said signal supplied to said first input terminal exceeds a predetermined value of said reference signal, and a control circuit means having a first input terminal which is connected to a source of timing signals, spaced in a predetermined way and each having a predetermined duration, and having a second input terminal which is connected to said output terminal of said threshold comparator and at least a first output terminal connected to said control terminal of the circuit biasing means, and wherein said control circuit is inhibited from generating an output signal during the time intervals in which a timing signal is supplied to said first input terminal and generating an output signal for the whole time interval between a first timing signal and the timing signals subsequent thereto when, at the moment at which the supply of this first timing signal to said first input terminal ceases, a signal is simultaneously supplied to said second input terminal.

BRIEF DESCRIPTION OF THE DRAWINGS

The invention is described in detail in the following description, given purely by way of non-limiting example, with reference to the attached drawings, in which.

The same reference letters are used for corresponding components in the Figures.

DESCRIPTION OF THE PREFERRED EMBODIMENTS

Figure 1:
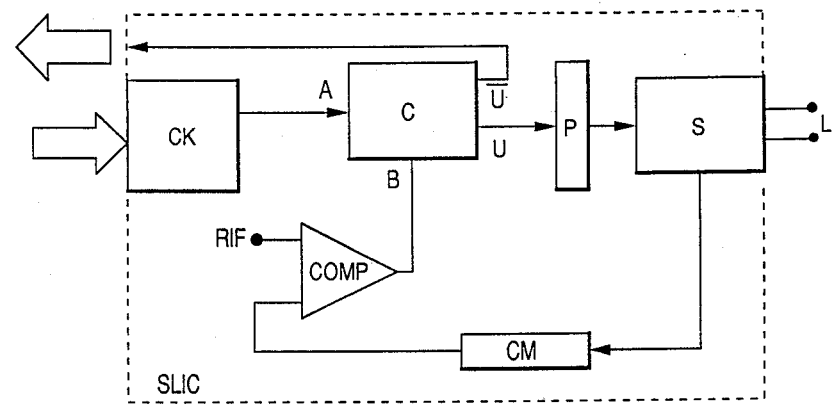
FIG. 1 is a block diagram of a telephone interface circuit of the invention.

A telephone circuit of the invention is shown overall in FIG. 1 by a rectangular block in dashed lines shown by the symbol SLIC.

In the technical literature, a SLIC (Subscriber Line Interface Circuit) is used to designate a monolithically integrated interface circuit connected to a subscriber's telephone line which also supplies the line itself.

Terminals or other devices for connection to the exchange control apparatus not shown in the Figures are indicated by two arrows, one in the input direction and one in the output direction.

A pair of output terminals for connection to the subscriber's telephone line (not shown) are indicated by L.

These output terminals are the output terminals of circuit means S for the supply of the subscriber's telephone line contained in the circuit SLIC.

Block S comprises a circuit structure of the bridge type formed by two output amplifier components, between which the subscriber's telephone line, and all the apparatus connected thereto, is inserted as a load.

A telephone circuit of the present invention also comprises a circuit means, not shown in detail in the block diagram, for receiving, amplifying and transmitting signals under the control of the exchange control components, the operation of these circuit means and of the means for supplying the subscriber's telephone line is ensured by a circuit biasing means P connected thereto.

The circuit biasing means, shown in FIG. 1 by the block P connected to the block S, has at least one control terminal to which a signal may be supplied to cut off the remainder of the circuit or part thereof and in particular to disactivate the circuit means S supplying the subscriber's telephone line.

The discontinuation of the supply to the subscriber's telephone line can thus be controlled through this control terminal.

The circuit also comprises circuit current detector means CM which is connected to the subscriber's telephone line via the circuit supply means S.

The circuit means CM is designed to continuously generate a measurement signal of the instantaneous value of the "longitudinal" or "common-mode" currents having at every instant an identical amplitude and an identical direction in both wires of the line.

A possible circuit embodiment of the circuit means S and CM is set out, for example, in U.S. Pat. No. 4,782,507.

The circuit also comprises a threshold comparator COMP having a first and a second input terminal respectively connected to a reference signal source RIF and to the circuit means CM.

The threshold comparator COMP has an output terminal through which it generates a signal when the value of the signal generated by the circuit means CM exceeds a predetermined value.

A source of timing signals, spaced in a predetermined manner and each having a predetermined duration, is shown by a block CK in FIG. 1.

This source may either be a signal generator within the circuit or a simple terminal for connection to the exchange components or a circuit for processing signals coming from the exchange (for example, a series of frequency dividers).

The timing signals preferably used have a regular repetition rate with a comparatively long period (typically 1–10 seconds), a very short time duration (typically 0.1–0.3 seconds) and a rectangular waveshape.

In the block diagram shown in FIG. 1, letter C indicates a control circuit having a first input A and a second input B respectively connected to the source CK of timing signals and to the output terminal of the comparator COMP, a first output terminal U connected to the control terminal of the circuit biasing means P and a second output terminal $\overline{U}$ connected to the exchange control components.

Figure 2:
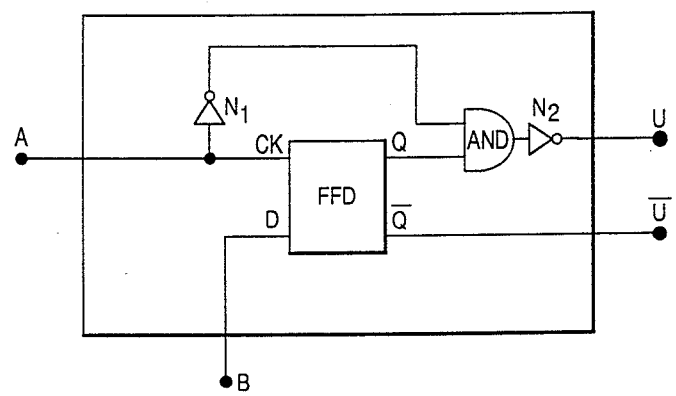
FIGS. 2 and 3 are preferred embodiments of the circuits of two of the blocks of FIG. 1.

When a signal is supplied to its first input terminal A, the control circuit C, a circuit embodiment of which is shown in FIG. 2, does not generate any output signals even if a signal is simultaneously being supplied to the second input terminal B.

It generates, however, an output signal (via both terminals U and $\overline{U}$) during the whole time interval between a first timing signal and the subsequent timing signal, when, at the moment at which the supply of this first timing signal to the first input terminal A ceases, a signal is simultaneously supplied to the second input terminal B.

When the grounded cable condition occurs in a subscriber's telephone line with both wires of the line short-circuited to ground, the amplitude of the longitudinal currents increase substantially.

The value of the measurement signal generated by the circuit current detector means then exceeds the predetermined value which determines the threshold of the comparator COMP.

The comparator thus begins to generate an output signal which is supplied to the second terminal B of the control circuit C.

From the time at which the supply of the first timing signal following the line breakage to the first input terminal A ceases, at which time the control circuit can "sense" the signal supplied to the second input terminal B, the control circuit in turns begins to generate an output signal.

This signal, supplied to the control terminal of the circuit biasing means P, causes the cut-off of parts of the telephone circuit itself and the disconnection of the supply to the subscriber's telephone line, thus stopping electrical energy from being consumed as a result of the breakdown.

As long as the grounded cable condition persists, the control circuit C continues to generate the cut-off signal during all of the time intervals between the timing signals.

During the short time intervals in which the timing signals are supplied to the first input terminal A, the line is again supplied and the control circuit can again detect the grounded cable condition and control the cut off after each timing signal until the following signal.

As soon as the grounded cable condition is repaired, the comparator no longer generates any output signal even when the line is supplied again. Consequently, at the end of the supply to the first input terminal A of the first timing signal following or simultaneous with the repair of the breakdown, the control circuit C sense the removal of the grounded cable condition and allows the line to continue to be normally supplied.

It can be seen that in this way current consumption, limited in any case by the protection already included in the integrated circuit, takes place only during the extremely brief periods of re-activation.

No further current limitation is thus required and the exchange can operate even when a multiple telephone cable is cut without any detriment to subscribers not directly affected by the breakdown.

FIG. 2 shows a preferred circuit diagram embodiment used for the control circuit C.

It comprises a memory element FFD formed by a D-type flip-flop which changes its state at the trailing edge of the timing signals.

This flip-flop has a first CK and a second input terminal D which respectively form the first A and second input terminal B of the control circuit C.

The input terminal of a first inverter circuit NI, whose output terminal is connected to a first input terminal of a logic gate of AND type, is also connected to the first input terminal A.

This logic gate has a second input terminal which is connected to a first output terminal Q of the flip-flop.

It has an output terminal connected to the input terminal of a second inverter circuit N2.

The output terminal of the inverter circuit N2 forms the first output terminal U of the control circuit C.

A second output terminal $\overline{Q}$ of the flip-flop forms the second output terminal of the control circuit C, used for connection to the exchange control components which generate, when the subscriber's line is cut, an appropriate signal to callers showing that this line is busy.

Figure 3:
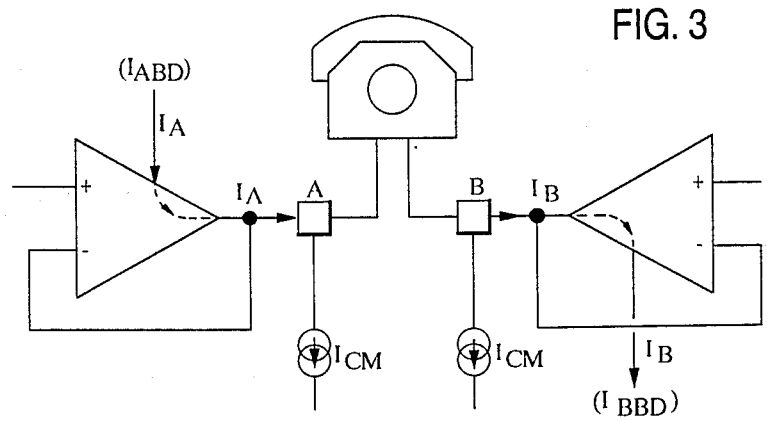

FIG. 3 illustrates an example of the block S and is discussed in detail in U.S. Pat. No. 4,782,507.

Although a single embodiment of the invention has been described and illustrated, it is obvious that may variants are possible without departing from the scope of the present invention.

We claim:

1. A telephone circuit for forming an interface between a subscriber's telephone line and exchange control components, comprising: a means for supplying the subscriber's telephone line; a means for receiving, amplifying and transmitting signals under the control of the exchange control components; a current detecting means for generating a measurement signal corresponding to the instantaneous value of the common-mode currents on the line and a circuit biasing means having at least a control terminal for enabling the normal operation of the telephone circuit and for causing the disconnection of at least said means supplying the subscriber's telephone line when a signal is supplied to said control terminal; a threshold comparator having a first input terminal to which the signal generated by said means for detecting current is supplied; a second input terminal to which a reference signal is supplied and an output terminal via which said comparator generates a signal when the value of said signal supplied to said first input terminal exceeds a predetermined value of said reference signal, and a control circuit means having a first input terminal which is connected to a source of timing signals, spaced in a predetermined way and each having a predetermined duration, and having a second input terminal which is connected to said output terminal of said threshold comparator and at least a first output terminal connected to said control terminal of the circuit biasing means, and wherein said control circuit is inhibited from generating an output signal during the time intervals in which a timing signal is supplied to said first input terminal and generating an output signal for the whole time interval between a first timing signal and the timing signals subsequent thereto when, at the moment at which the supply of this first timing signal to said first input terminal ceases, a signal is simultaneously supplied to said second input terminal.

2. A telephone circuit as claimed in claim 1, wherein said control circuit means comprises: a first circuit component having first and second input terminals which respectively form said first and second input terminals of said control means and having at least a first output terminal; a second circuit component having an input terminal which is connected to said input terminal of said first circuit component and having an output terminal; a third circuit component having a first and a second input terminal respectively connected to said first output terminal of said first circuit component and to said output terminal of said second circuit component and having an output terminal and a fourth circuit component having an input terminal connected to said output terminal of said third circuit component and having an output terminal which forms said first output terminal of said control circuit means; wherein said first circuit component generates an output signal only when, at the time at which the supply of a timing signal to its first input terminal ceases, a signal is simultaneously supplied to its second input terminal, this output signal being generated up to the instant in which the supply of the successive timing signal ceases, said second and fourth circuit components both generating an output signal only in the absence of signals being supplied to their input terminals and said third circuit component generating an output signal only when a signal is simultaneously supplied to both of its input terminals.

3. A telephone circuit as claimed in claim 2, wherein said supplied timing signals having a rectangular type waveshape with a front leading edge and a rear trailing edge.

4. A telephone circuit as claimed in claim 3, wherein said first circuit component is a D-type flip-flop which changes its state at the trailing edge of the timing signals, and wherein said second and fourth circuit components are logic inverter circuits and said third circuit component is an AND logic gate.

5. A telephone circuit as claimed in claim 1, wherein said control circuit means has a second output terminal for coupling to a sensor for detecting the engagement of the subscriber's telephone line contained in the exchange control components.

* * * * *